United States Patent
Saliba et al.

(10) Patent No.: US 6,558,774 B1
(45) Date of Patent: May 6, 2003

(54) MULTIPLE-LAYER BACKCOATING FOR MAGNETIC TAPE

(75) Inventors: George A. Saliba, Northboro; Satya Mallick, Milford; Daravuth Seng, Dudley; Geon Choe, Northboro, all of MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/376,118

(22) Filed: Aug. 17, 1999

(51) Int. Cl.$^7$ .............................................. G11B 5/735
(52) U.S. Cl. ................ 428/156; 428/323; 428/694 TB; 428/694 BB; 369/44.11; 369/275.4; 369/277; 369/279
(58) Field of Search .................... 428/694 TB, 694 BB, 428/323, 332, 402, 457, 900, 156; 427/130, 131, 555; 369/44.11, 93, 94, 272, 275.1, 275.4, 277, 278, 279

(56) References Cited

U.S. PATENT DOCUMENTS

| | | |
|---|---|---|
| 2,923,781 A | 2/1960 | Gordon et al. |
| 3,404,392 A | 10/1968 | Sordello |
| 3,426,337 A | 2/1969 | Black et al. |
| 3,637,991 A | 1/1972 | Yanagawa |
| 3,662,120 A | 5/1972 | Hess |
| 3,768,752 A | 10/1973 | Bettini et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Lairidon et al. |
| 4,008,085 A | 2/1977 | Lemahieu et al. |
| 4,123,788 A | 10/1978 | Kruger |
| 4,176,381 A | 11/1979 | de Niet et al. |
| 4,275,425 A | 6/1981 | Watanabe et al. |
| 4,313,143 A | 1/1982 | Zarr |
| 4,315,283 A | 2/1982 | Kinjo et al. |
| 4,340,305 A | 7/1982 | Smith et al. |
| 4,371,904 A | 2/1983 | Brooke |
| 4,380,032 A | 4/1983 | Pfost |
| 4,424,111 A | 1/1984 | Moeller et al. |

(List continued on next page.)

FOREIGN PATENT DOCUMENTS

| | | |
|---|---|---|
| CH | 586 944 | 4/1977 |
| DE | 24 06 292 | 8/1975 |
| DE | 26 16 362 | 11/1977 |
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |
| EP | 0 097 774 | 1/1984 |

(List continued on next page.)

OTHER PUBLICATIONS

English Translation of JP 04–252417 A.*

*Primary Examiner*—Paul Thibodeau
*Assistant Examiner*—Kevin M. Bernatz
(74) *Attorney, Agent, or Firm*—Fish & Richardson P.C.

(57) ABSTRACT

A magnetic tape comprises a substrate having on one side thereof a magnetic layer serving as a recording surface, and on the other side thereof at least two layers containing inorganic particles which serve as a non-recording surface, wherein said magnetic tape has a region on the side of the non-recording surface along the longitudinal direction of the tape in which a regular pattern for servo tracking having different optical properties from the other major region of the side of the non-recording surface is or can be formed. The layers on the non-recording surface are characterized in that the inorganic particles in the outermost layer are larger than the inorganic particles in the underlying layer(s).

14 Claims, 7 Drawing Sheets

U.S. PATENT DOCUMENTS

| | | |
|---|---|---|
| 4,558,383 A | 12/1985 | Johnson |
| 4,570,191 A | 2/1986 | Di Stefano et al. |
| 4,578,311 A | 3/1986 | Ishikuro et al. |
| 4,626,469 A | 12/1986 | Yamaguchi et al. |
| 4,633,451 A | 12/1986 | Ahn et al. |
| 4,679,104 A | 7/1987 | Dahlerud |
| 4,737,877 A | 4/1988 | Krongelb et al. |
| 4,746,542 A | 5/1988 | Chino et al. |
| 4,750,067 A | 6/1988 | Gerfast |
| 4,802,030 A | 1/1989 | Henry et al. |
| 4,816,939 A | 3/1989 | Ford et al. |
| 4,816,941 A | 3/1989 | Edel et al. |
| 4,843,494 A | 6/1989 | Cronin et al. |
| 4,848,698 A | 7/1989 | Newell et al. |
| 4,868,046 A | 9/1989 | Moriizumi et al. |
| 4,876,886 A | 10/1989 | Bible et al. |
| 4,884,260 A | 11/1989 | Bouldin et al. |
| 4,935,835 A | 6/1990 | Godwin et al. |
| 4,937,810 A | 6/1990 | Drexler et al. |
| 4,958,245 A | 9/1990 | Roth et al. |
| 4,961,123 A | 10/1990 | Williams et al. |
| 4,969,058 A | 11/1990 | Williams et al. |
| 4,983,496 A | 1/1991 | Newell et al. |
| 5,008,765 A | 4/1991 | Youngquist |
| 5,016,240 A | 5/1991 | Strandjord et al. |
| 5,038,030 A | 8/1991 | Hayashi et al. |
| 5,050,017 A | 9/1991 | Carr et al. |
| 5,065,387 A | 11/1991 | Roth et al. |
| 5,067,039 A | 11/1991 | Godwin et al. |
| 5,105,322 A | 4/1992 | Steltzer |
| 5,120,927 A | 6/1992 | Williams et al. |
| 5,121,371 A | 6/1992 | Farnsworth et al. |
| 5,163,032 A | 11/1992 | Van Nieuwland et al. |
| 5,196,297 A | 3/1993 | Dombrowski et al. |
| 5,196,969 A | 3/1993 | Iwamatsu et al. |
| 5,210,672 A | 5/1993 | Ivers et al. |
| 5,229,620 A | 7/1993 | Pahr |
| 5,262,908 A | 11/1993 | Iwamatsu et al. |
| 5,279,775 A | 1/1994 | Thomas et al. |
| 5,280,402 A | 1/1994 | Anderson et al. |
| 5,283,773 A | 2/1994 | Thomas et al. |
| 5,311,378 A | 5/1994 | Williams et al. |
| 5,319,507 A | 6/1994 | Umebayashi et al. |
| 5,322,987 A | 6/1994 | Thomas et al. |
| 5,333,091 A | 7/1994 | Iggulden et al. |
| 5,349,484 A | 9/1994 | Koehler |
| 5,363,255 A | 11/1994 | Ivers et al. |
| 5,369,631 A | 11/1994 | Hwang |
| 5,371,636 A | 12/1994 | Nayak et al. |
| 5,379,283 A | 1/1995 | Miyajima |
| 5,379,710 A | 1/1995 | Schwarz |
| 5,414,578 A | 5/1995 | Lian et al. |
| 5,414,585 A | 5/1995 | Saliba |
| 5,432,652 A | 7/1995 | Comeaux et al. |
| 5,448,430 A | 9/1995 | Bailey et al. |
| 5,450,257 A | 9/1995 | Tran et al. |
| 5,452,152 A | 9/1995 | Rudi |
| 5,457,586 A | 10/1995 | Solhjell |
| 5,462,823 A | 10/1995 | Evans et al. |
| 5,510,140 A | 4/1996 | Kurose et al. |
| 5,515,212 A | 5/1996 | Chiao et al. |
| 5,518,804 A | 5/1996 | Mizuno et al. |
| 5,523,904 A | 6/1996 | Saliba |
| 5,532,042 A | 7/1996 | Kawarai et al. |
| 5,535,069 A | 7/1996 | Chiao et al. |
| 5,563,868 A | 10/1996 | Farnsworth et al. |
| 5,566,033 A | 10/1996 | Frame et al. |
| 5,589,247 A | 12/1996 | Wallack et al. |
| 5,615,205 A | 3/1997 | Belser |
| 5,661,616 A | 8/1997 | Tran et al. |
| 5,661,823 A | 8/1997 | Yamaguchi et al. |
| 5,674,583 A | 10/1997 | Nakayama et al. |
| 5,675,448 A | 10/1997 | Molstad et al. |
| 5,677,806 A | 10/1997 | Eckberg et al. |
| 5,680,278 A | 10/1997 | Sawtell, Jr. |
| 5,689,384 A | 11/1997 | Albrecht et al. |
| 5,705,268 A | 1/1998 | Ishikawa et al. |
| 5,718,964 A | 2/1998 | Naoe et al. |
| 5,726,834 A | 3/1998 | Eckberg et al. |
| 5,774,313 A | 6/1998 | Tanaka et al. |
| 5,855,589 A | 1/1999 | McEwen et al. |
| 5,858,589 A | 1/1999 | Govaert et al. |
| 5,872,675 A | 2/1999 | Solhjell |
| 5,877,910 A | 3/1999 | Williams et al. |

FOREIGN PATENT DOCUMENTS

| | | |
|---|---|---|
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 461 | 7/1992 |
| EP | 0 549 845 | 7/1993 |
| EP | 0 549 854 | 7/1993 |
| EP | 0 555 511 | 8/1993 |
| EP | 0 564 187 | 10/1993 |
| EP | 0 645 043 | 12/1993 |
| EP | 0 645 044 | 12/1993 |
| EP | 0 655 960 | 12/1993 |
| EP | 0 598 503 | 5/1994 |
| EP | 0 606 710 | 7/1994 |
| EP | 0 684 597 | 11/1995 |
| EP | 0 854 471 | 7/1998 |
| FR | 2 315 142 | 1/1977 |
| GB | 2 008 290 | 5/1979 |
| GB | 1 595 136 | 8/1981 |
| GB | 2 121 227 | 12/1983 |
| JP | 56-111169 | 9/1981 |
| JP | 57-050346 | 3/1982 |
| JP | 57-120230 | 7/1982 |
| JP | 57-120255 | 7/1982 |
| JP | 61-142530 | 6/1986 |
| JP | 61-293372 | 12/1986 |
| JP | 62-192025 | 8/1987 |
| JP | 63-148416 | 6/1988 |
| JP | 63-251924 | 10/1988 |
| JP | 64-070916 | 3/1989 |
| JP | 2-169915 | 6/1990 |

| | | | | | | |
|---|---|---|---|---|---|---|
| JP | 3-094881 | 4/1991 | | JP | 9-293230 | 11/1997 |
| JP | 3-141087 | 6/1991 | | JP | 9-297914 | 11/1997 |
| JP | 3-201215 | 9/1991 | | JP | 9-320197 | 12/1997 |
| JP | 3-219432 | 9/1991 | | JP | 10-043924 | 2/1998 |
| JP | 3-242816 | 10/1991 | | JP | 10-190867 | 7/1998 |
| JP | 4-003832 | 1/1992 | | JP | 10-251432 | 9/1998 |
| JP | 4-038632 | 2/1992 | | JP | 10-297181 | 11/1998 |
| JP | 4-059399 | 2/1992 | | JP | 11-066529 | 3/1999 |
| JP | 4-252417 | 9/1992 | | JP | 11-066745 | 3/1999 |
| JP | 4-305844 | 10/1992 | | JP | 11-096705 | 4/1999 |
| JP | 5-073883 | 3/1993 | | JP | 11-126328 | 5/1999 |
| JP | 6-020414 | 1/1994 | | JP | 11-154312 | 6/1999 |
| JP | 6-139549 | 5/1994 | | JP | 11-161928 | 6/1999 |
| JP | 6-243619 | 9/1994 | | JP | 11-213383 | 8/1999 |
| JP | 6-259736 | 9/1994 | | JP | 11-213384 | 8/1999 |
| JP | 7-029136 | 1/1995 | | KR | 9406847 | 7/1994 |
| JP | 7-057412 | 3/1995 | | SU | 1137513 | 1/1985 |
| JP | 7-065434 | 3/1995 | | WO | WO 83/01858 | 5/1983 |
| JP | 7-220255 | 8/1995 | | WO | WO 85/02933 | 7/1985 |
| JP | 7-082626 | 9/1995 | | WO | WO 85/03376 | 8/1985 |
| JP | 8-174669 | 7/1996 | | WO | WO 88/02168 | 3/1988 |
| JP | 9-007131 | 1/1997 | | WO | WO 94/12975 | 6/1994 |
| JP | 9-033773 | 2/1997 | | WO | WO 99/21178 | 4/1999 |
| JP | 9-035246 | 2/1997 | | WO | WO 99/21179 | 4/1999 |
| JP | 9-288813 | 4/1997 | | WO | WO 99/27530 | 6/1999 |
| JP | 9-265626 | 10/1997 | | WO | WO 99/28909 | 6/1999 |
| JP | 9-289885 | 11/1997 | | | | |
| JP | 9-289973 | 11/1997 | | * cited by examiner | | |

FIG. 1

LASER BEAMS

MULTIPLE-LAYER BACKCOATING FOR MAGNETIC TAPE

BACKGROUND OF THE INVENTION

The invention relates to magnetic tape capable of optically recording servo signals for tracking. More particularly, it relates to magnetic tape capable of optically recording servo signals for tracking while exhibiting excellent tape runnability and other mechanical properties.

Generally, magnetic tape has a low recording density due to its low track density. Serpentine type magnetic tape in particular typically has a low recording density. On the other hand, helical scan type magnetic tape, which uses a servo tracking system called automatic track finding (ATF), possesses a higher track density than serpentine type magnetic tape.

Servo tracking systems proposed for serpentine type magnetic tape include an embedded servo system, in which servo signals are written on the same track as the data track on the magnetic recording surface, and a system in which a track exclusively for servo signals is provided on the magnetic recording surface. For example, Japanese Patent Publication No. 82626/95 discloses a servo control system where the pitch of the data tracks is as small as several tens of microns. In this system, a dedicated track for servo information is provided on the magnetic recording surface and a plurality of servo reproduction heads are used for reading the servo signals. According to this technique, however, the number of servo reproduction heads must be increased as the number of tracks increases. This system and other conventional servo tracking systems use the same side of the magnetic tape for servo tracking as is used for data recording, which means that the data recording area is reduced accordingly. This disadvantage is conspicuous in the servo tracking system of Japanese Patent Publn. No. 82626/95 when the track density is about 30 tracks per mm or more.

This disadvantage can be overcome by locating the servo tracking system on the side of the tape opposite the recording (magnetic) side. Such a system is described in co-owned co-pending application USSN 09/191,321, which is hereby incorporated herein by reference. The system described in USSN 09/191,321 utilizes a pattern containing a dye or other material which changes color upon being contacted with a light source, thereby permitting servo tracking of the tape.

Magnetic tapes often have a coating or layer disposed on the side of the tape opposite the recording side. Such coatings are called "backcoating" layers. Backcoating layers are designed to improve certain mechanical properties of the tape. For example, the presence of an appropriate backcoating can improve the tape runnability (e.g., the stability of the tape as it "runs" past reading or recording heads) or its durability. Backcoating layers often contain a binder resin and an inorganic pigment, such as carbon black. See, for example, JP 9297914; JP 6139549; KR 9406847 and U.S. 4,578,311. USSN 09/191,321, incorporated by reference above, describes adding a backcoating to the tape in addition to the servo tracking color changing coating.

SUMMARY OF THE INVENTION

It is an object of the present invention to provide a magnetic tape having a multilayer backcoating system which has excellent mechanical properties and which permits a servo tracking pattern to be etched directly into the backcoating.

The present invention is a magnetic tape including a recording surface on one side and a non-recording surface on the side opposite the recording surface. The recording surface has a magnetic layer disposed thereon. The non-recording surface has disposed thereon a novel, multilayer backcoating system including at least two discrete layers containing inorganic particles in which the particles in the outermost layer are different from (i.e.,larger than) than the particles in the inner layer(s). The larger particles in the outer layer are of a size sufficient to provide improved tape runnability and conductivity, and reduced reflectance. The smaller particles in the inner layer or layers are of a size sufficient to provide improved servo cutting quality to the tape.

The backcoating system on the tape of the present invention has a regular pattern for servo tracking disposed along the longitudinal direction of the tape. The servo tracking pattern may include, for example, a series of discrete marks, such as pits or depressions, in the backcoating. The pattern also may comprise continuous depressed lines or grooves. The pattern can be formed, for example, by etching, cutting, engraving or burning the backcoating, e.g., mechanically or using a laser. The process of forming the servo tracking pattern is referred to herein as "servo cutting." The marks thus formed have optical properties which are different from the non-patterned region of the backcoating, and can be distinguished by an optical tracking device. For example, a pattern formed by laser etching may comprise a series of pits or depressions in the backcoating. When a light source is directed onto the backcoating, the pattern of depressions will absorb or reflect light differently than the surrounding non-patterned region of the backcoating. These differences can be detected by an optical detector, and processed by a signal processor to operate the servo system which keeps the tape property aligned. The pattern permits servo tracking of the tape as it runs thereby improving the track density of the tape.

The present invention provides a multilayer backcoat system which has excellent mechanical properties and also permits high quality servo cutting. The present invention accomplishes both purposes by utilizing a multilayer backcoating system in which the outer layer, which in operation is in contact with the tape rollers, has a surface roughness sufficient to provide good mechanical properties; and an underlying or inner layer or layers having less surface roughness, that is, having a smoother surface, thereby providing better servo pattern cutting.

In order to provide high quality servo cutting and tape runnability, the backcoating preferably has a uniform smooth surface. However, smooth coatings can result in deterioration of certain mechanical performance of the tape. For example, tapes having a very smooth backcoating may exhibit poor lateral tape motion, high friction between the tape and the tape rollers, and poor tape modulation and stacking. Rougher backcoating surfaces provide better electrical conductability, better heat conductability and improved mechanical properties, but the quality of the servo cutting is reduced.

The roughness or smoothness of the surface is a function of the size of the inorganic particles used in the backcoating. Larger particles provide a rougher surface, whereas smaller particles provide a smoother surface. Thus, in the present invention, the outermost backcoating layer includes a coating or film having larger inorganic particles (e.g., having an average size greater than about 50 nm) and the inner layer comprises a coating or film having smaller inorganic particles (e.g., having an average size less than about 40 nm). There may be more than one inner layer, if desired.

The present invention provides a magnetic tape which furnishes servo information without reducing the data area, a magnetic tape which furnishes information for servo tracking while maintaining a high S/N ratio and excellent tape runnability, a magnetic tape which furnishes servo information without impairing the mechanical properties of the tape provided by the backcoating layer, a magnetic tape having an increased track density, and a magnetic tape having a high recording capacity.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

The magnetic tape of the present invention will be further described with reference to the preferred embodiments thereof depicted in the accompanying drawings.

Figure 1:
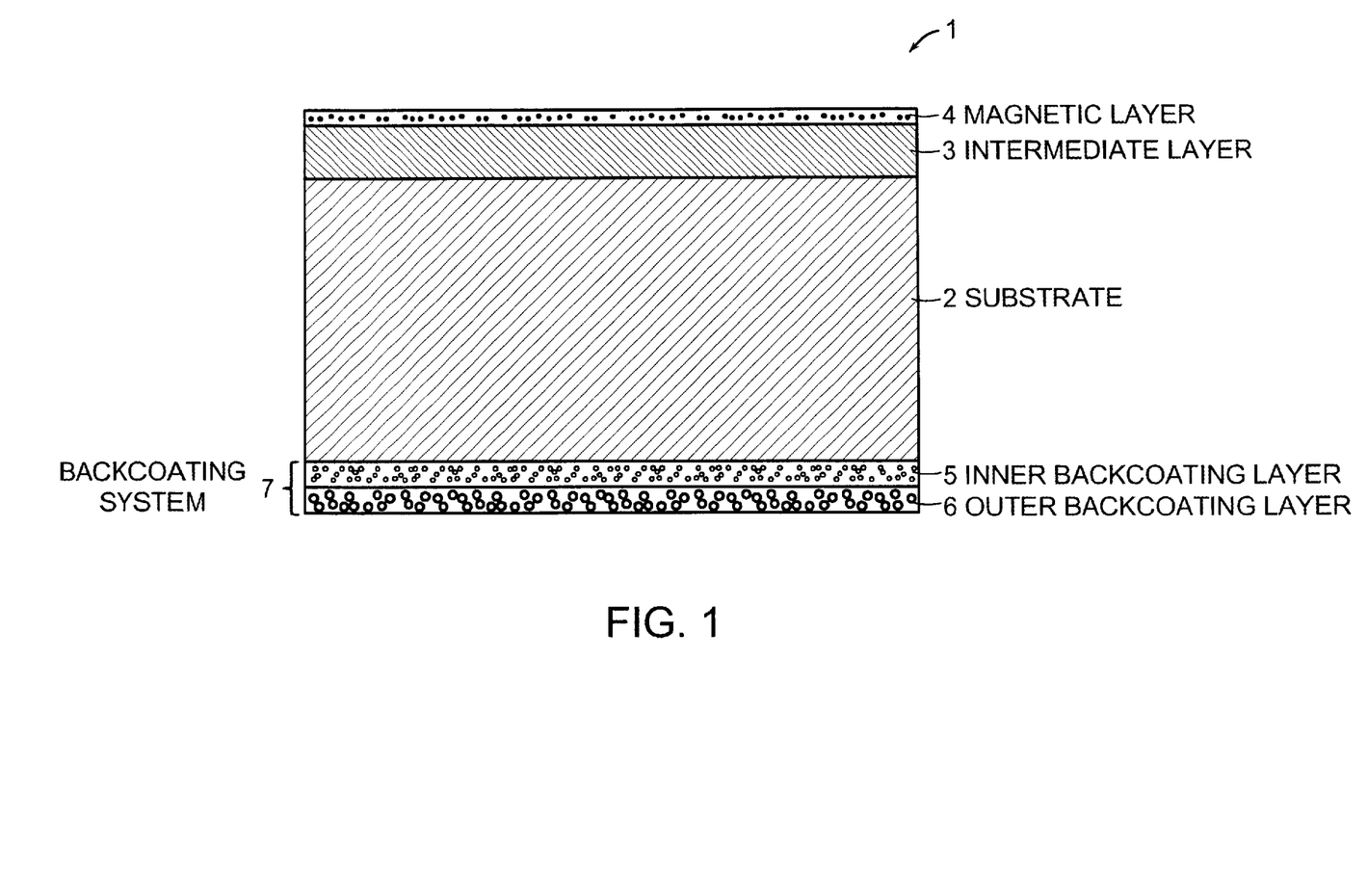
FIG. 1 is a schematic view showing the structure of a first embodiment of the magnetic tape according to the present invention.

A magnetic tape 1 shown in FIG. 1 comprises a substrate 2 having provided thereon a magnetic layer 4 as a top layer adjoining an optional intermediate layer 3. The magnetic layer 4 serves as a recording surface. The substrate 2 has on its other side a multilayer backcoating system comprising inner layer 5 containing inorganic particles, and outer layer 6 containing inorganic particles which are different from (i.e., larger than) the particles in layer 5.

The term "recording surface" as used herein means a surface used for magnetic recording, and the term "non-recording surface" as used herein means a surface which does not participate in magnetic recording.

The magnetic tape 1 can be for a linear or serpentine recording system, in which the magnetic layer 4 contains a plurality of data tracks in parallel with the tape running direction. In operation, a head unit having a prescribed number of magnetic heads is moved across the magnetic tape 1, switching among data tracks, to record or reproduce data on the prescribed data tracks. In order to position each magnetic head on a proper data track by track switching for recording or reproduction, servo tracking is carried out.

Layer 6 is the outermost layer on the non-recording side of the magnetic tape 1. The term "outermost" refers to the layer furthest removed from the substrate 2. Layer 6 contains inorganic particles of a size sufficient to provide good mechanical properties, conductivity and heat dissipation to the tape. Mechanical properties include, for example, a tape motion, friction (e.g., between the tape and the tape transport rollers), tape modulation and tape stacking. Inorganic particles of from about 30 nm to about 100 nm in diameter are useful for this purpose. In a currently preferred embodiment, inorganic particles in the size range of from about 50 nm to about 80 nm are used in layer 6.

Layer 5 is an inner layer on the non-recording surface of magnetic tape 1. Layer 5 contains inorganic particles which are smaller than the particles in layer 6. The smaller particles form a smoother coating (compared to layer 6) which allows good servo pattern cutting quality. Inorganic particles of from about 10 nm to about 80 nm in diameter are useful for this purpose. In a currently preferred embodiment, inorganic particles in the range of from about 20 nm to about 35 nm are used in layer 5. The magnetic tape 1 may contain additional inner layers, if desired.

Layers 5 and 6 together form what is termed herein the "backcoating system" (7 in FIG. 1). The backcoating system 7 may contain additional layers, which may be either clear or pigmented. A servo tracking pattern having optical properties which differ from the non-patterned portion of the region can be formed on the backcoating system 7. The servo tracking pattern preferably is etched into at least a portion of each of the layers in the backcoating system 7. While not limiting, the optical properties as referred to herein include properties expressed in terms of the absorbance or reflectance of light.

Figure 2:
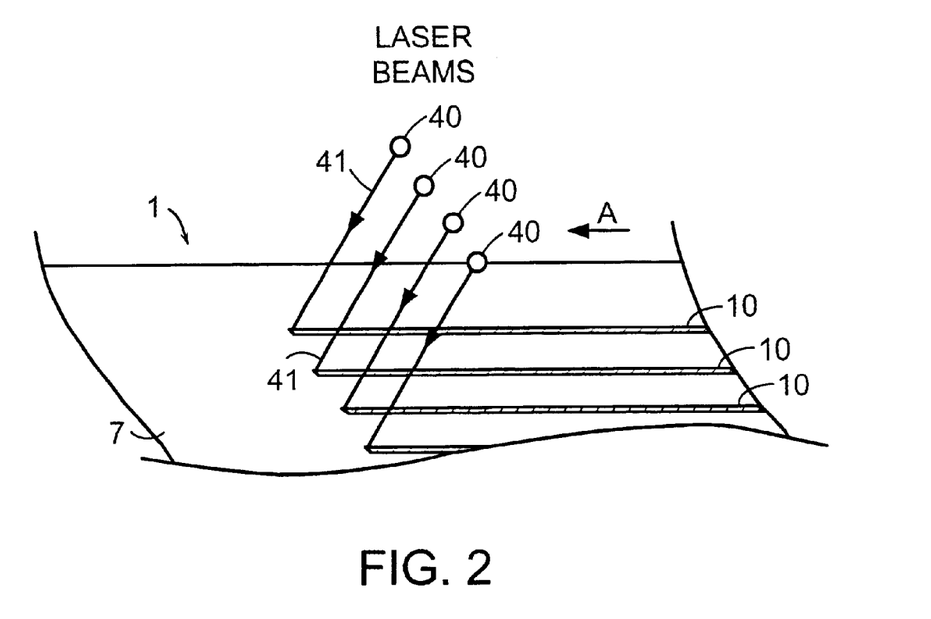
FIG. 2 schematically illustrates a method for forming a servo tracking pattern by irradiating a backcoating layer with a laser beam.

FIG. 2 illustrates one method by which a servo tracking pattern can be cut, etched or engraved into the backcoating. As shown in FIG. 2, a plurality of laser beams 41, emitted in parallel from the respective laser light sources 40 aligned at prescribed intervals across the width direction of the magnetic tape 1, etch backcoating system 7 running in direction A at a predetermined speed. The pattern 10 is formed by laser beams 41. The irradiation conditions of the laser beams 41 should be controlled so as to produce engraved marks, burn marks or depressions in backcoating system 7 without damaging substrate 2 or layers 3 and 4 on the recording side of the tape. The pattern 10 formed in backcoating system 7 shown in FIG. 2 is not to scale, and the number of lines (shown as four in FIG. 2) may vary. The size and depth of the marks in pattern 10 are such that when a light or laser beam is shone on the patterned backcoating, the marks can be recognized by measuring the intensity of the light reflected or absorbed by the pattern. The pattern 10 shown in the embodiment illustrated in FIG. 3 comprises a plurality of continuous lines of prescribed width in parallel to the longitudinal direction of the magnetic tape 1. The width w of each line and variation of the thickness of the pattern 10 can be adjusted by controlling the beam diameter and output power of the laser beams 41. In this embodiment, the beam diameter preferably is between about 0.25 to 30 $\mu$m, particularly between about 1 to 25 $\mu$m, and the output power is preferably from about 1 to about 1000 mW, particularly from about 10 to about 100 mW. The pattern 10 can be formed before use of the magnetic tape 1 or by use of a recording and reproducing drive equipped with an irradiating means.

While, in general, the pattern 10 is formed over the whole length of backcoating system 7 which corresponds to the length of magnetic layer 4, the area in which a pattern is to be formed is not limited thereto. The pattern 10 makes an optical contrast with the non-patterned areas 10' of the backcoating system 7. As stated previously, data tracks of magnetic layer 4 can be formed in parallel in the longitudinal direction on the recording side of magnetic tape 1 similarly to pattern 10, but the relative positional relationship between the data tracks (not shown) and pattern 10 is not limited.

The optical contrast between pattern 10 and the surrounding non-patterned background 10' can be made by irradiating pattern 10 with light of a prescribed wavelength to produce a difference in the intensity of absorbed or reflected light. The intensity of the absorbed or reflected light is detected and processed by an optical servo mechanism, using, for example, a push-pull method or three-beam method, to carry out servo tracking. Optical servo mechanisms are commonly employed for achieving optical servo control in various optical disks.

Figure 4A:
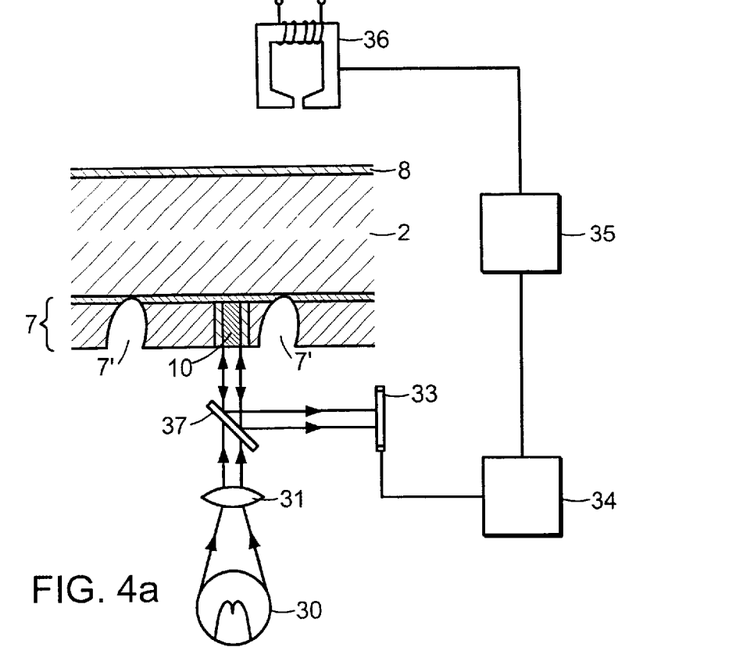
FIG. 4(a), FIG. 4(b), FIG. 4(c) and FIG. 4(d) schematically illustrate a method for achieving servo control by push-pull method.
Figure 4B:
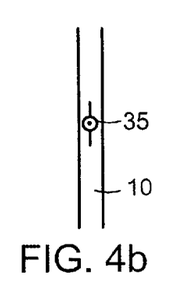
Figure 4C:
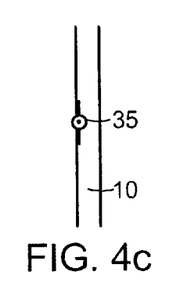
Figure 4D:
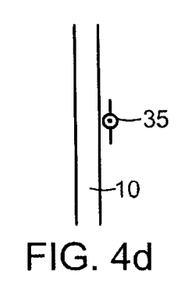

Servo control based on the contact of reflected light intensity using the push-pull method can be carried out as follows. In FIG. 4(a), magnetic tape runs in the direction perpendicular to the surface of the paper on which FIG. 4(a) is drawn. Light is emitted from a light source 30, such as a semiconductor laser, which is placed to face the multilayer backcoating system 7. The light beam then is condensed through a lens 31 to a prescribed beam diameter, is passed through a half mirror 37, and impacts on backcoating system 7 and pattern 10 formed in the backcoating system 7 where it is scattered by the rough surface of layer 6 or by depressions 7'. The beam diameter preferably should be somewhat smaller than the line width of pattern 10. Some of the light is reflected by outermost layer 6 and pattern 10 and advances in the direction opposite to the incidence direction. The reflected light is reflected on the half mirror 37, turning its direction, and enters the light detector 33, where the intensity of the reflected light is detected. The detected reflected light is converted to electrical signals in the detector 33 and then sent to the servo tracking processor 34, where the signals are processed by the servo control system. The amount and intensity of the light reflected from pattern 10 can be distinguished by the detector and/or signal processor from the light reflected from layer 6. The servo tracking processor 34 analyzes the intensity of the reflected light. If the beam intensity displays bilateral symmetry, it means that the center of the beam 35 is on the center line of the line width of the pattern 10 as shown in FIG. 4(b). This state is an "on-track" state, that is, the magnetic head is properly positioned on an aimed data track of the magnetic layer 4. If the beam intensity lacks bilateral symmetry, it indicates that the beam 35 is deviating from the center line to either left or right as shown in FIG. 4(c) or (d). This state is an "off-track" state, that is, the magnetic head is not properly positioned on the aimed data track of the magnetic layer. Then the servo tracking processor 34 gives a drive 35 of the magnetic head 34 instructions to move the magnetic head 36 to a proper position as shown in FIG. 4(a). As a result, the magnetic head 36 is properly positioned by the drive 35 to achieve an "on-track" state.

Figure 3:
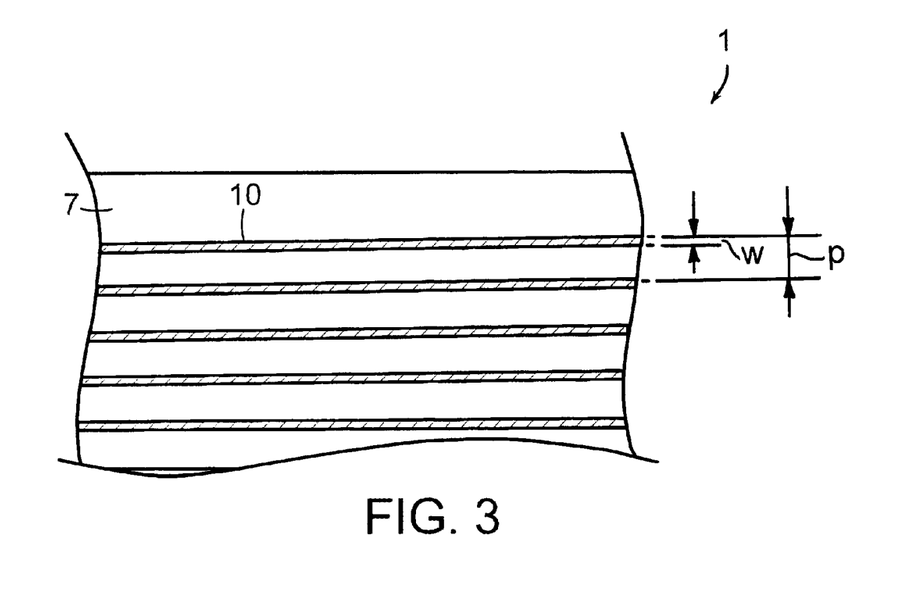
FIG. 3 is an enlarged partial view of the backcoating layer having an engraved servo tracking pattern.

The width w (see FIG. 3) of pattern 10 preferably is from about 0.25 to about 50 $\mu$m while somewhat varying with the width of the magnetic tape 1. If the width w is smaller than about 0.25 $\mu$m, optical detection of the pattern 10 may be disturbed because it is difficult to condense the beam to such a small diameter with state-of-the-art techniques. If the width w exceeds about 50 $\mu$m, the density of pattern 10 decreases where the pattern is comprised of a large number of lines as illustrated in FIG. 3. A preferred width w of pattern 10 is from about 0.25 to about 30 $\mu$m, particularly from about 0.8 to about 25 $\mu$m.

It is preferred that the pitch p of pattern 10, i.e., the pitch of the lines or marks (see FIG. 3), be not less than the width of the data track formed on the magnetic layer 4 and be an integral multiple of the width of the data track.

The marks or lines composing pattern 10 may be arranged over the whole width of the magnetic tape 1 at prescribed intervals, or a group of marks or lines spaced at prescribed intervals may be localized in, for example, the central portion or either one of side portions of the tape in the width direction. There may be two or more groups of marks or lines localized in two or more positions of the tape in the width direction. For example, one or more groups of marks, which may consist of the same or different number of marks, can be arranged on each side portion of the tape; one or more groups of marks, which may consist of the same or different number of marks, can be arranged on the central portion and one of the side portions of the tape; or one or more groups of marks, which may consist of the same or different number of marks, can be arranged on the central portion and each side portion of the tape. In any case, the total number of the marks (or lines) making up pattern 10 preferably is a measure of the number of the data tracks of the magnetic layer.

As stated above, the backcoating layer typically serves several essential functions, including: (1) providing satisfactory tape running properties, (2) providing antistatic properties, and (3) detecting the beginning of the tape (BOT) or the end of the tape (EOT). In addition, the backcoating of the present invention provides a medium for carrying servo tracking marks. Backcoatings typically comprise a substantially homogeneous mixture of inorganic particles dispersed in a binder resin.

The backcoating layers 5 and 6 may be formed solely of the inorganic particles but preferably contain a binder in order to improve the running properties and/or durability of magnetic tape 1. The weight percentage of the inorganic particles to the binder, which is subject to variation according to the size and kind of the particles, is preferably from about 1% to about 90%, still more preferably from about 20% to about 80%.

Any binder customarily employed in coatings for magnetic tape can be used. For example, thermoplastic resins, thermosetting resins, reactive resins, and mixtures thereof can be used. Specific examples include vinyl chloride copolymers or modified vinyl chloride copolymers, copolymers comprising acrylic acid, methacrylic acid or esters thereof, polyvinyl alcohol copolymers, acrylonitrile copolymers (rubbery resins), polyester resins, polyurethane resins, epoxy resins, cellulosic resins (e.g. nitrocellulose, cellulose acetate, cellulose acetate butyrate, cellulose acetate propionate, etc.), polyvinyl butyral resins, and polyamide resins. These binders preferably have a number average molecular weight of from about 2,000 to about 200,000. The binder resin can have a polarizing functional group (so-called polar group), such as a hydroxyl group, a carboxyl group or a salt thereof, a sulfoxyl group or a salt thereof, a phospho group or a salt thereof, a nitro group, a nitric ester group, an acetyl group, a sulfuric ester group or a salt thereof, an epoxy group, a nitrite group, a carbonyl group, an amino group, an alkylamino group, an alkylammonium salt group, a sulfobetaine structure, a carbobetaine structure, and the like, to have improved dispersing properties for particulate additives which could be incorporated into the backcoating (hereinafter described).

To provide satisfactory running properties, it is preferred that the outermost layer 6 has a moderate-to-high surface roughness. The outermost backcoating layer 6 preferably has an arithmetic mean roughness Ra of from about 7 to about 50 nm, more preferably from about 5 to about 30 nm, and most preferably from about 9.0 to about 12.0 mn. The outer coating 6 also preferably has about a 10 point height parameter Rz of from about 40 to about 250 nm, more preferably from about 50 to about 200 nm, and most preferably from about 80 nm to about 120 nm. The inner backcoating layer 5 preferably has an arithmetic mean roughness Ra of from about 6 to about 40 nm, more preferably from about 4 to about 20 nm, and most preferably from about 6.0 to about 9.0 nm. The inner coating preferably has a 10 point Rz of from about 30 to about 200 mn, more preferably from about 40 to about 150 nm, and most preferably from about 50 to about 80 mn.

The arithmetic mean roughness Ra, defined by the following equation (1), is measured with a stylus-type profilometer under the following conditions in accordance with JIS-B0601-1994.

| Stylus: | diameter 1.5 to 2.5 gm; curvature: 600 |
|---|---|
| Contact pressure: | 50 to 300 $\mu$N |
| Cut-off length: | 80 $\mu$m |
| Sampling length: | 80 $\mu$m |
| Assessment length: | 400 $\mu$m |

$$Ra = \frac{1}{l}\int l|Y(x)|dx \qquad (i)$$

wherein Y represents profile data; and l represents an assessment length.

In measuring the surface roughness Ra, a sample is stuck to a slide glass for microscopes which satisfies the requirements specified in JIS-R-3502 (e.g. a slide glass produced by MATSUNAMI GLASS K.K. as used in the present invention) with water or ethanol to prepare a specimen. Existence of excessive water or ethanol will ruin the reproducibility of measurements.

Therefore measurement is made after the water or ethanol is evaporated to some extent and while an interference fringe can be seen from the back side of the slide glass.

Measurement of the 10 point height parameter Rz, defined by the following equation (ii), can be made using the same specimen under the same conditions as for the measurement of Ra in accordance with JIS-B0601-1994. The sampling length l is 80 $\mu$m, and the assessment length $l_0$ is 400 $\mu$m.

$$Rz = |Y_{p1} + Y_{p2} + Y_{p3} + Y_{p4'} + Y_{p5}| + Y_{v1} + Y_{v2} + Y_{v3} + Y_{v4'} + Y_{v5} \qquad (ii)$$

wherein $Y_{p1}$, $Y_{p2}$, $Y_{p3}$, $Y_{p4}$, and $Y_{p5}$ are heights of the five highest peaks within the assessment length l; and $Y_{v1}$, $Y_{v2}$, $Y_{v3}$, $Y_{v4}$, and $Y_{v5}$ are height of the five lowest valleys within the assessment length l.

The arithmetic mean roughness Ra and the height parameter Rz are functions of the particle size of the inorganic particles used in the coatings. Inorganic powders having an average particle size of from about 1 to about 700 nm can be used to obtain the desired characteristics.

The outermost layer 6 preferably comprises inorganic particles having a particle size in the range of from about 10 to about 200 nm, more preferably from about 50 nm to about 80 nm. The thickness of the outer layer as applied to the magnetic tape preferably is in the range of from about 0.1 to about 0.5 $\mu$m, more preferably from about 0.1 to about 0.15 $\mu$m. The amount of the inorganic particles in the coating preferably is from about 5 to about 90% by weight, more preferably from about 42 to about 50% by weight. The currently preferred coating as applied preferably has the following characteristics:

Surface roughness: Ra: 9.0 to 12.0 nm Rq: 11.0 to 14.0 nm Rz: 80.0 to 120.0 nm

Resistance: $8.4 \times 10^4$ to $4 \times 10^5$ $\Omega$/square

Reflectance at 550–800 nm: 6–10%

The inner layer 5 preferably comprises inorganic particles having a particle size in the range of from about 5 to about 100 nm, more preferably from about 20 nm to about 35 nm. The thickness of the inner layer preferably is from about 0.1 to about 0.5 $\mu$m, more preferably from about 0.35 to about 0.40 $\mu$m. The amount of inorganic particles in the coating preferably is from about 5 to about 80% by weight, more preferably from about 30 to about 40% by weight. The resulting coating preferably has the following characteristics:

Surface roughness: Ra: 6.0 to 9.0 nm Rq: 8.0 to 10.0 nm Rz: 50.0 to 80.0 nm

Resistance: $5.0 \times 10^5$ to $2 \times 10^6$ $\Omega$/square

Reflectance at 550 to 800 nm: <10%

Inorganic powders which are useful in the present backcoating layers include carbon black, metallic powders, metallic oxides, metallic sulfides and mixtures of the aforementioned. The powders are not particularly limited in kind as long as their average particle sizes satisfy the above respective ranges. Powders useful in the present invention include, for example, substantially spherical particles of TiO, $TiO_2$, $\alpha$-$Fe_2O_3$, $BaCO_3$, $BaSO_4$, $Fe_3O_4$, $\alpha$-$Al_2O_3$, $\gamma$-$Al_2O_3$, $CaCO_3$, $Cr_2O_3$, ZnO, $ZnSO_4$, $\alpha$-FeOOH, Mn-Zn ferrite, Ni-Zn ferrite, ZnS, tin oxide, antimony-doped tin oxide (ATO), indium-doped tin oxide (ITO), indium oxide, carbon black, graphite carbon, $SiO_2$, and silicone resins having a three-dimensional network structure made up of siloxane bonds with a methyl group bonded to the silicon atom. Of the above-enumerated inorganic powders, black powder, such as carbon black, is particularly preferred. Carbon black particles provide the additional advantage of being electrically conductive, and thus impart antistatic properties to the tape.

The carbon black contained in the backcoating may be any commercially available carbon black having the necessary size and uniformity. For example, channel black, furnace black, acetylene black, thermal black, or graphited carbon black may be used. Carbon black particles in the size ranges required for use in the present invention can be obtained from Cabot Corporation (Billerica, Mass.); Asahi Carbon K.K. (Japan); Mitsubishi Kasei Corp. (Japan); Tokai Carbon (Japan): and Akzo N.V. (the Netherlands).

Non-black inorganic conductive particles may be useful in some embodiments of the invention. For example, particles of conductive tin oxide, ATO, ITO, and indium oxide may be advantageous because of their high light transmitting properties in the case where transmitted rather than reflected or absorbed light is utilized for servo signal reading. In this connection, preferred inorganic conductive particles include tin oxide, ATO, ITO, and indium oxide. The inorganic conductive particles preferably are present in an amount of from about 10 to about 800 parts, particularly from about 30 to about 700 parts, especially from about 50 to about 700 parts, by weight per 100 parts by weight of the binder.

If desired, the backcoating layers 5 and 6 can contain other additives, such as a lubricant and a hardener. Generally useful lubricants for such coatings include fatty acids and fatty acid esters. Examples of fatty acid lubricants include, for example, caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid. Examples of fatty acid ester lubricants include alkyl esters of the above-enumerated fatty acids having 16 to 46 carbon atoms in total. Inorganic acid esters, such as phosphoric esters, fluorine-containing compounds, silicone compounds, and the like also are useful as lubricants. The lubricants typically are added in an amount of from about 0.05 to about 15 parts by weight, preferably from about 0.2 to about 10 parts by weight, per about 100 parts by weight of the binder.

The backcoating layers also may contain an antioxidant to improve the stability of the coatings. The antioxidant preferably is added in an amount of from about 0.5 to about 20 parts by weight, particularly from about 3 to about 10 parts by weight, per 100 parts by weight of the coloring matter. Any antioxidant compatible with backcoating compositions can be used. Specific examples of suitable antioxidants include bis(4-t-butyl-1,2-dithiophenolate) copper-tetra-n-butylammonium and bis(4-t-butyl-1,2-dithiophenolate) nickel-tetra-n-butylammonium.

The hardeners include isocyanate hardeners, exemplified by "CORONATE L" (a trade name, produced by NIPPON POLYURETHANE INDUSTRY Co., Ltd.) and amine hardeners. The hardeners can be added in an amount of from about 5 to about 40 parts by weight, preferably from about 5 to about 30 parts by weight, per 100 parts by weight of the binder.

If desired, the backcoating compositions further may contain stabilizers.

Backcoating compositions useful for forming the backcoating layers can be formulated according to art recognized techniques for making these types of coatings. In one embodiment, the backcoating layers are formed on the tape by coating the substrate 2 with a coating composition having the above-mentioned components dispersed in a solvent. Examples of suitable solvents include ketones, esters, ethers, aromatic hydrocarbons, chlorinated hydrocarbons, and cellosolve solvents. The solvent preferably is used in such an amount that the coating composition has a solids content of from about 10 to about 50% by weight, particularly from about 20 to about 40% by weight.

The present backcoating compositions may be formed by any technique appropriate for forming pigmented coatings. Methods of formulating backcoating compositions are well-known, and are described, for example, in co-pending application USSN 09/191,321, and in U.S. Pat. Nos. 5,532,042 and 4,868,046.

The thickness of the outer layer 6 formed by applying the coating composition is preferably in the range of from about 0.05 to about 2.0 μm, more preferably from about 0.1 to about 0.15 μm. The thickness of inner layer 5, also formed by applying the coating composition, is preferably in the range of from about 0.05 μm to about 2.0 μm, more preferably from about 0.35 μm to about 0.4 μm.

In another embodiment, the backcoating layers may consist solely of the inorganic particles. Such coatings can be formed by, for example, one of the following methods (1) to (3):

(1) thin film formation processing, such as chemical vapor deposition (CVD) or physical vapor deposition (PVD);

(2) coating the substrate 2 with a solution or dispersion of the inorganic particles in a solvent which can, if desired, contain a surface active agent; or (3) co-extruding the substrate 2 with a solution or dispersion of the inorganic particles in a polymer or a polymer emulsion.

Where the backcoating layer comprises the inorganic particles and other components, the other components may include a binder, a lubricant, and the like that could be incorporated into the layers as described above. Inorganic powders in addition to the preferred carbon black particles can be included, for example, to prevent disturbances of the interface between the backcoating layer 5 and the backcoating layer 6 when these two layers are formed by simultaneous coating in a wet-on-wet system, which will be described later in detail.

In a currently preferred embodiment, the inner backcoating layer 5 is formed by coating the substrate with a composition comprising the inorganic particles, a binder and, optionally, one or more of the above-described additional components dispersed in a solvent. Outer backcoating layer 6 then is formed by applying a coating composition containing inorganic particles and a binder dispersed in a solvent to the substrate coated with inner layers. The backcoating compositions can be applied either by successive coating or simultaneous coating. Noting that the successive coating method may have lower productivity, the preferred coating method is to simultaneously apply both coatings according to a wet-on-wet system, which achieves higher productivity.

The outer backcoating layer 6 of the magnetic tape 1 preferably has a reflectance at 550 to 800 nm of at least about 5%, and preferably in the range of from about 6% to about 10%, before the servo marks are imposed.

For achieving precise servo control, it is preferred that the change in reflectance at the wavelength of incident light used for servo signal reading between the pattern 10 and the non-patterned area of the backcoating surface, i.e. the value represented by equation (2) shown below, be 10% or more, particularly 40% or more.

$$\text{Change in reflection } (\%) = \frac{[Rm - Ro]}{Rm} \times 100 \qquad (2)$$

wherein Ro represents a reflectance (%) of a servo tracking pattern at the wavelength of incident light; and Rin represents a reflectance (%) of the area other than the servo tracking pattern at the wavelength of incident light.

Figure 5:
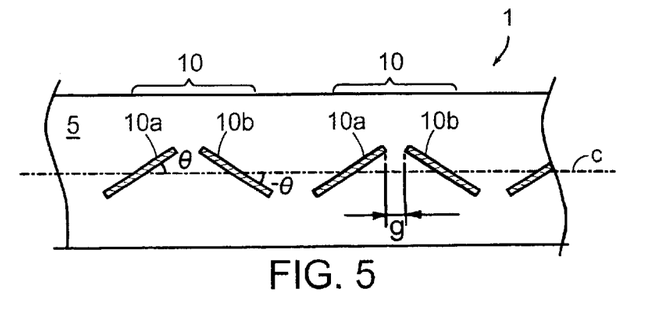
FIG. 5 shows a discontinuous pattern of servo marks.
Figure 6A:
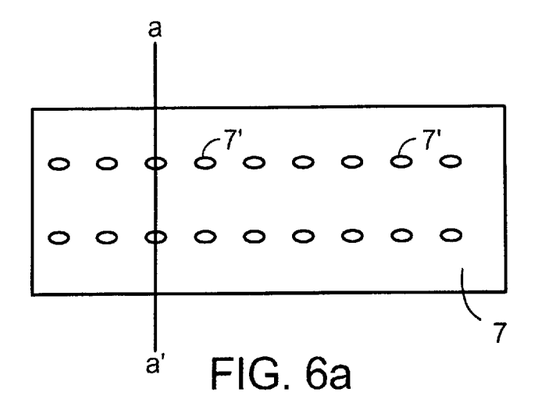
FIG. 6(a) is a schematic plane view showing a detectable servo track in the form of a series of depressions or pits.
Figure 6B:
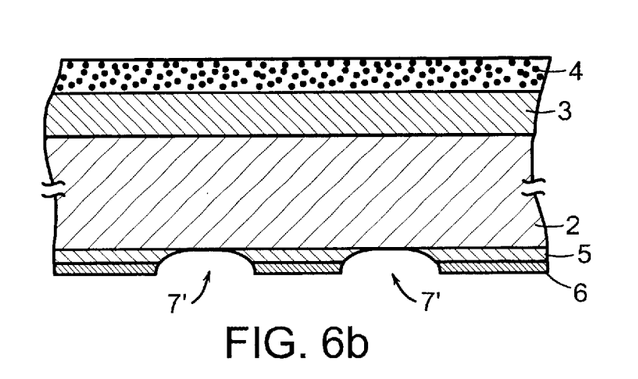
FIG. 6(b) is a schematic cross-sectional view through section $a–a^1$ showing the structure of the magnetic tape of FIG. 6(a) having a servo track formed of laser engraved marks.
Figure 6C:
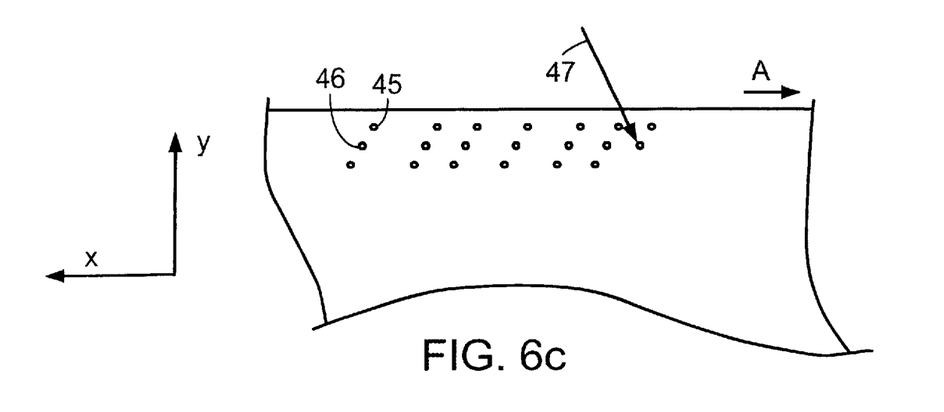
FIG. 6(c) depicts a process for laser engraving an optically detectable servo track onto the non-recording surface of a tape formed as described herein.

The backcoating system 7 of the magnetic tape 1 according to this embodiment has a pattern 10 of lines along or marks the longitudinal direction of the magnetic tape 1 as shown in FIGS. 3 and 6(*a*). FIG. 3 shows four lines, however, a single straight line or a different number of lines along the longitudinal direction of the tape 1 can be used. The pattern also may be a single or a plurality of sine curves along the longitudinal direction of the tape 1. Further, pattern 10 may comprise discontinuous segments of lines (e.g., discrete marks) along the longitudinal direction of the tape 1 as shown in FIG. 5, or a series of pits or depressions as shown in FIGS. 6(*a*)–(*c*).

The pattern 10 shown in FIG. 5 is made up of repeating pairs of pieces 10*a* angled at $\Theta°$, with the longitudinal direction of magnetic tape 1 and a piece 10*b* angled at $-\Theta°$, the pieces 10*a* and 10*b* alternating with each other in the longitudinal direction of the tape 1. The angle $\Theta$ has an influence on the precision of positioning by servo tracking. A preferred angle $\Theta$ for securing sufficient precision of positioning is about 5 to about 85°, particularly about 10 to about 30°. The lengths of the pieces 10*a* and the pieces 10*b* may the same or different, but preferably are the same. A preferred length of the pieces 10*a* and 10*b* is about 5 to 140 mm, particularly about 5 to about 80 mm. The spacing g between the piece 10*a* and the piece 10*b* making each pair is preferably as narrow as possible. The servo signals of pattern 10 shown in FIG. 5 can be read in the same manner as for the pattern 10 shown in FIG. 3.

The pattern 10 representing servo information preferably is imposed on the magnetic tape before use. When the magnetic tape 1 is used, the pattern is irradiated from the non-recording side of the tape 1 with light having a prescribed wavelength, and the reflected or absorbed light is detected. Thus, the servo signals are read as the contrast of reflected light intensity or absorption between the pattern 10 and the non-patterned regions of the backcoating.

The servo tracking pattern formed in the backcoating system 7 can be formed by an engraving process that irradiates the backcoating layers with an energy beam, such as an electron beam, a particle beam, or any laser beam of suitable wavelength, such as for example an ultraviolet laser light beam in the range of about 260–300 nm. The depressions so formed extend through the outer layer 6 into backcoating layer 5, thereby forming optically detectable marks that can be organized into patterns, such as a pattern of dots spaced transversely across the tape. The laser engraving process allows formation of marks in the range of from about 1 to about 10 microns. Accordingly, a backcoating layer of a one half inch wide tape can carry many servo tracks. For example, laser light can be employed for forming a plurality of servo tracks on backcoating layers 6 and 5, wherein each of the servo tracks comprises a series of linearly spaced sets of dots, each set of dots being arranged transversely across a portion of the backcoating surface. The irradiated surface burned or etched by the laser engraving process forms depressions 7' (see FIGS. 6(*a*) and 6(*b*)) of prescribed depth at regular intervals along the longitudinal direction of the tape. The regularly spaced depressions form the pattern. FIG. 6(*b*) shows a cross-sectional view of the depressions 7' in backcoating system 7.

In order to form a servo tracking pattern with which precise servo control can be carried out, the laser beam for pattern formation preferably has a diameter of from about 0.1 to about 30 $\mu$m, particularly from about 1 to about 10 $\mu$m. The output power of the laser beam is selected so as to etch or burn the backcoating layers to form the depressions without damaging the other layers constituting the magnetic tape 1 and the substrate 2. Such an output power preferably ranges from about 1 to about 50 mW, particularly about 3 to about 25 mW, per incident beam. Short pulses of a high output laser beam of from about 1 to about 100 W can also be used. The wavelength of the laser beam is preferably about 0.5 to about 1.3 $\mu$m, particularly from about 0.5 to about 0.8 $\mu$m, from the standpoint of the light absorption of the coating. The wavelength of the laser beam is preferably from about 0.2 to about 1.3 $\mu$m, particularly from about 0.25 to about 0.8 $\mu$m, from the standpoint of the light absorption of the carbon black.

Figure 7:
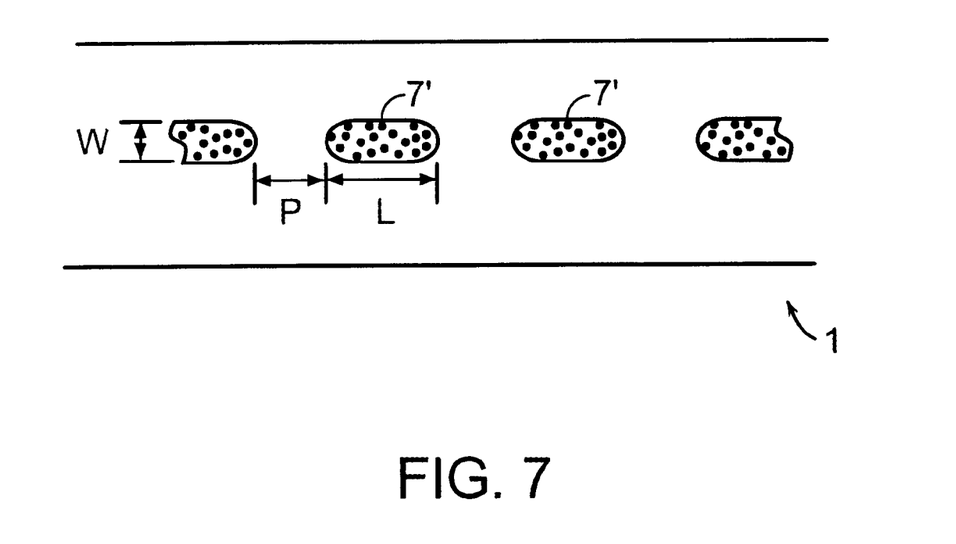
FIG. 7 is an enlarged plane view of a single line servo tracking pattern.

FIG. 7 depicts an enlarged plane view of a servo tracking pattern. In this embodiment, the pattern is a linear series of depressions or pits located approximately on the centerline of the width direction of the tape 1. Such a pattern provides improved sensitivity in servo signal reading. The depression 7' preferably has a width W of from about 0.1 to about 30 $\mu$m, particularly from about 1 to about 20 $\mu$m for obtaining precise servo control and minimizing the thermal influence on the substrate 2 in pattern formation. The length L of each depression 7' is preferably from about 1 to about 100 $\mu$m, particularly about 2 to about 20 $\mu$m, to assure servo signal detection. The distance P between adjacent depressions 7' is preferably from about 2 to about 100 $\mu$m, particularly from about 50 to about 90 $\mu$m, for reading the individual depressions 7' with high sensitivity. The distance P can be chosen so that the velocity of the tape divided by P is much larger than the bandwidth, or expected bandwidth, of the lateral motion of the tape. This is understood to achieve improved sampling data. The depth of each depression 7' is preferably at least from about $\frac{1}{3}$, more preferably at least $\frac{2}{3}$, of the thickness of the inner backcoating layer 5 up to the whole thickness of the inner backcoating layer 5.

Optionally, the tape depicted in FIGS. 6(*a*) and 6(*b*) may include a reflective layer of a metal or metal alloy having a low melting point, such as aluminum, disposed between backcoating layer 5 and substrate 2 that provides a reflective layer for increasing the reflective characteristic of the servo tracking layer carried on the backcoating. The servo tracking pattern may include depressions formed in the metal or metal alloy having a low melting point pattern typically will have a width of from 0.1 $\mu$m to 30 $\mu$m and a depth from one-third the thickness up to the entire thickness of the metal or metal alloy.

FIG. 2 depicts one process for forming a servo layer on the tape. As depicted, a laser engraving process can be employed that directs a laser beam 41 of selected wavelength toward the surface to be marked, thereby forming a line or a series of pits on the surface that can be detected by an optical servo head, such as described above. FIG. 6(*c*) shows an embodiment in which a tape having a plurality of marks 46 formed thereon provide a pattern 45 of three marks that are aligned on an axis that is transverse to an axis perpendicular to the edge of the tape. For example, the three mark pattern can be tilted about 7 degrees off axis. As also shown in FIG. 6(*c*), the laser beam 47, (which can be, for example, a UV laser beam in the range of approximately 260 to 330 nm) irradiates the tape to form repeating series of the three dot pattern 45 that can extend along a partial or the full length of the tape. In a preferred embodiment, the laser beam 47 forms pits in the carbon black-containing backcoating layer on the order of about 2 to about 10 microns, with a pitch between marks 46 of about 1 to about 6 microns and a pitch between patterns 45 of about 1 to about 100 microns. However, it will be apparent to one of ordinary skill in the art that the mark size and pitch can be altered according to the specific application.

Figure 8:
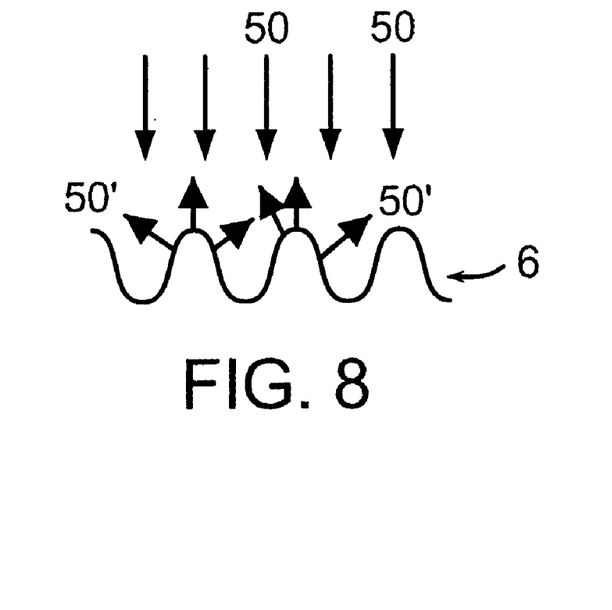
FIG. 8 is a schematic illustration of light reflected from a rough backcoating surface.
Figure 9:
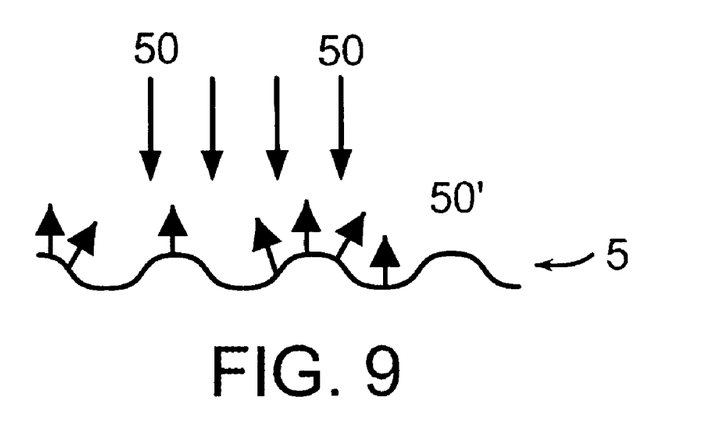
FIG. 9 is a schematic illustration of light reflected from a smooth surface.
Figure 10A:
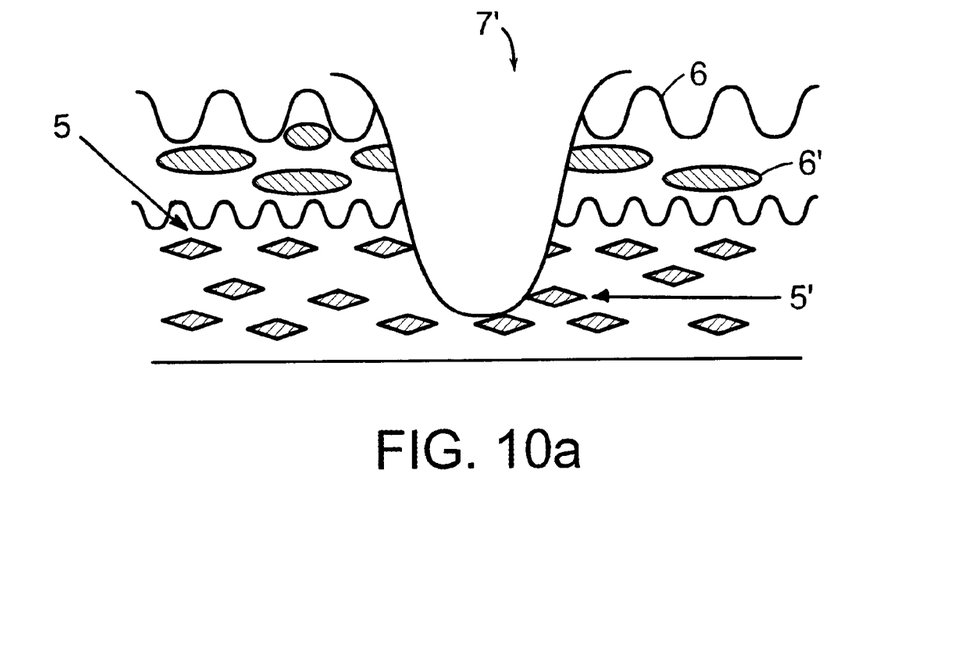
FIG. 10(a) is a schematic view of a dual layer backcoating system of the present invention.
Figure 10B:
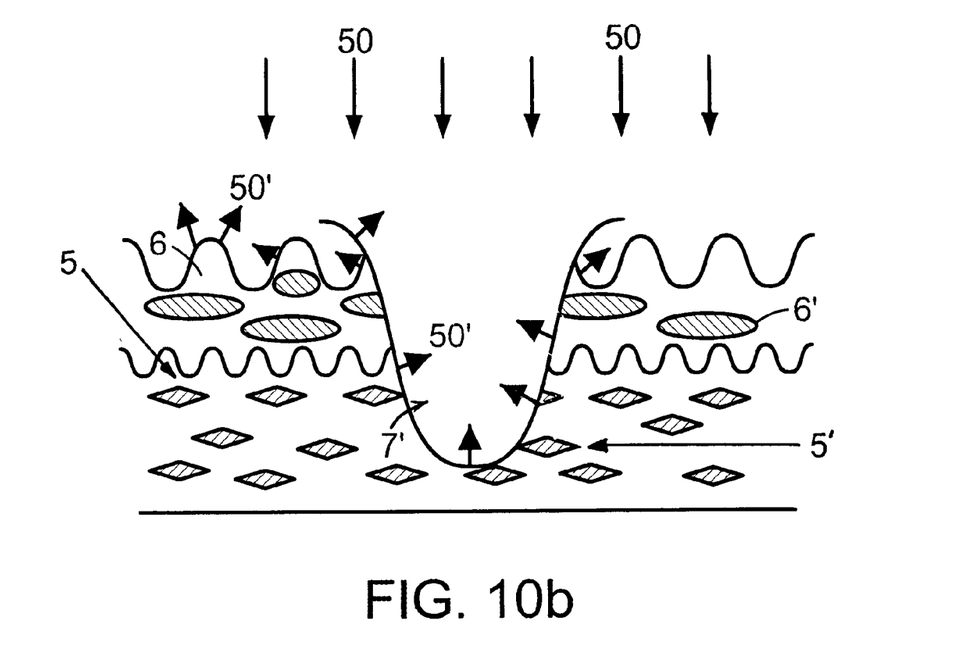
FIG. 10(b) is a schematic illustration of light reflected from the backcoating surface and the servo tracking pattern.

The servo track is "read" by directing a light source, such as a laser beam, onto the backcoating layer 6. The depressions 7' reflect light differently than the non-patterned portion of backcoating layer 6. FIG. 8 is a schematic illustration showing incident light beams 50 being directed at the rough surface of backcoating 6. As shown in FIG. 8, reflected light 50' is scattered in several directions by the rough surface of layer 6. In comparison, FIG. 9 shows that light 50' reflected from smooth layer 5 has less scatter. FIG. 10(a) is a schematic representation of a backcoating system of the present invention in which pits 7' form part of an optical servo track pattern. In FIG. 10, the outer backcoating layer 6 contains large carbon particles 6', whereas inner backcoating layer 5 contains smaller carbon particles 5'. Depressions 7' forming part of an optical servo track are made through all of layer 6 and at least a portion of layer 5. As shown in FIG. 10(b), light hitting the depressions is reflected differently than light hitting backcoating 6.

This difference can be detected by an optical detection system such as that depicted in FIG. 4(a).

For servo signal reading, light having a wavelength of from about 300 to about 1300 nm, more particularly from about 500 to about 800 nm is preferably used.

General items concerning the magnetic tape according to the present invention are now described. Unless particularly noted, the following description is common to all the aforesaid embodiments.

The magnetic layer 4 is formed by applying a magnetic coating composition comprising ferromagnetic powder and a binder to a tape substrate. The magnetic tape 1 is a magnetic tape of coated type. For example, magnetic recording coatings are described in U.S. Pat. No. 4,746,542; U.S. Pat. No. 5,718,964 and U.S. Pat. No. 5,532,042.

Ferromagnetic powders which can be used include acicular, spindle-shaped or tabular particles. Acicular or spindle-shaped ferromagnetic powders include ferromagnetic metal powder consisting mainly of iron and ferromagnetic iron oxide powder, and tabular ferromagnetic powder includes ferromagnetic hexagonal ferrite powder. Magnetic recording coatings are well known and described in the art. Preferred magnetic coatings are described in co-pending co-owned application USSN 09/191,321.

The tape also may include an intermediate layer (shown as layer 3 in the FIGS.) The intermediate layer 3 may be either magnetic or nomnagnetic. The magnetic intermediate layer 3 is a layer containing magnetic powder, formed by using a magnetic coating composition mainly comprising magnetic powder, nonmagnetic powder, a binder, and a solvent. The nonmagnetic intermediate layer 3 is a layer formed by using a nonmagnetic coating composition mainly comprising nonmagnetic powder, a binder, and a solvent. The coating composition for the intermediate layer 3, either magnetic or nonmagnetic, will be inclusively referred to as an intermediate layer coating composition. Intermediate layer compositions which can be used in the present invention are described, for example, on co-pending application 09/191,321.

The substrate 2 can be made of any conventional materials known for magnetic tape, such as those described in Japanese Patent Laid-Open No. 35246/97, column 2, lines 30–42. Of the materials described, nonmagnetic materials such as polyethylene terephthalate (PET), polyethylene naphthalate (PEN), and polyamide are suited. The substrate 2 preferably has a thickness of about 6 $\mu$m or smaller, particularly about 5 $\mu$m or smaller, for achieving a high recording capacity. A layer for easy adhesion can be provided on the surface of the substrate 2 for improving adhesion to other layer.

The total thickness of the magnetic tape 1 preferably is not greater than about 7 $\mu$m, more preferably from about 4.5 to about 6.8 $\mu$m. That is, the magnetic tape of the aforesaid embodiments is of extremely thin type. In general, stiffness of a magnetic tape decreases with reduction in thickness. It tends to follow that the contact of the magnetic tape with a magnetic head is reduced, which can result in a reduction of output. Where the magnetic tape 1 has a metallic thin layer which has high stiffness, the magnetic tape has high stiffness despite its small thickness. Therefore, the embodiments in which a metallic thin layer is provided are advantageous in that increase in recording capacity by reduction in total thickness can be accomplished without involving the problem of stiffness reduction.

A preferred method for producing the magnetic tape according to the present invention is described below. A magnetic coating composition for forming the magnetic layer 4 and an intermediate layer coating composition for forming the intermediate layer 3 are applied simultaneously to the substrate 2 in a wet-on-wet coating system to form coating layers corresponding to the magnetic layer 4 and the intermediate layer 3. That is, the magnetic layer 4 is preferably provided while the intermediate layer 3 is wet.

The coating layers are subjected to magnetic field orientation and dried, and the coated material is wound up. Thereafter, the coated material is calendered, and backcoating compositions are applied onto the back side of the substrate 2 to form the inner backcoating layers 5 and 6. Alternatively, formation of the intermediate layer 3 and the magnetic layer 4 may be preceded by formation of the backcoating layers 5 and 6. The coated material is aged at about 40 to about 80° C. for about 6 to about 100 hours and then slit to a prescribed width to obtain the magnetic tape 1. Before use of the magnetic tape 1, a prescribed pattern 10 providing servo signals is formed on the backcoating layers 5 and 6.

The above-mentioned simultaneous coating technique in a wet-on-wet coating system is described, e.g. in Japanese Patent Laid-Open No. 73883/93, column 42, line 31 to column 43, line 31. This is a technique in which the magnetic coating composition is applied before the intermediate layer coating composition dries. Where this technique is followed, there is obtained magnetic tape which causes few dropouts and can cope with high-density recording, the coating layers of which have excellent durability.

The magnetic field orientation treatment is carried out before each coating composition dries. The treatment can be performed by applying a magnetic field of about 40 kA/m or higher, preferably about 80 to 800 kA/m, in parallel with the side coated with the magnetic coating composition or passing the coated material through a solenoid type magnet of about 80 to 800 kA/m while the magnetic coating composition is wet. By this treatment under such conditions, the ferromagnetic powder in the magnetic layer 4 are oriented in the longitudinal direction of the tape 1. For the purpose of inhibiting the thus-oriented ferromagnetic powder from changing its orientation during the subsequent drying step, it is a preferred manipulation to apply warm air at from about 30 to about 50° C. from above the magnetic layer 4 immediately before the magnetic field orientation treatment, whereby the coated material is dried preliminarily to have a controlled residual solvent content in each layer.

The drying of the coating layers is carried out by, for example, supplying gas heated to about 30 to about 120° C. The degree of drying can be controlled by adjusting the temperature and the feed rate of the gas.

The calendering of the coated material is carried out by, for example, supercalendering, comprising passing the coated film between two rolls, such as a combination of a metal roll and a cotton roll or a synthetic resin roll, or a pair of metal rolls. The calendering is preferably carried out, for example, at a temperature of from about 60 to about 140° C. under a linear pressure of from about 1 to about 5 kN/cm.

If desired, the surface of the magnetic layer 4 can be subjected to a finishing step, such as burnishing or cleaning. It is possible to apply the magnetic coating composition and the intermediate layer coating composition by a general successive coating technique.

While the magnetic tape of the present invention has been described by referring to its preferred embodiments, it should be understood that the present invention is not limited thereto, and various changes and modifications can be made therein without departing from the spirit and scope of the present invention.

For example, the magnetic tape 1 according to any of the embodiments described herein has a multilayer structure having a magnetic layer 4 and an optional intermediate layer 3 on a substrate 2, the present invention is also applicable to magnetic tape having no intermediate layer.

The magnetic tape 1 according to the present invention achieves servo control by making use of reflected or absorbed light by selecting the materials constituting the backcoating layers 5 and 6 so as to have a proper reflectance or refractive index, etc.

The depressions 7' (servo tracking pattern) made in the backcoating layers can be replaced with a pattern printed on the outer backcoating layer 6 by various printing or coating methods such as gravure coating or ink jet printing. In this modification servo tracking control is carried out by utilizing the difference in optical properties between the printed pattern and the other region of the side of the non-recording surface.

Further, the servo tracking pattern in the foregoing embodiments can be a combination of (a) one or more than one lines having a prescribed width continuously extending in the longitudinal direction of the magnetic tape 1 and (b) discontinuous lines having a prescribed width arranged along the longitudinal direction of the tape 1. The servo tracking pattern may be composed of dots arranged in a line or a curve or a combination thereof.

The servo tracking pattern can also be composed of dots (circles, rectangles, triangles, crosses, etc.) or combinations thereof.

The present magnetic tape can have a primer layer between the substrate 2 and the intermediate layer 3 or the color-containing layer 5.

While the magnetic tape according to the above-described embodiments is of coated type, the effects of the present invention can be produced equally when the present invention is applied to magnetic tape of metal-deposited type.

The magnetic tape according to the present invention is suitable as audio visual recording tapes such as a DVC tape, an 8-mm video tape, and a DAT tape, and data storage tapes such as a DLT tape, a DDS tape, a ¼ in data cartridge tape, and a data 8-mm tape.

Equivalents

Those skilled in the art will be able to ascertain many equivalents to the specific embodiments described herein. Such equivalents are intended to be encompassed by the scope of the following claims.

What is claimed is:

1. A magnetic tape comprising a substrate having disposed on opposite sides thereof a magnetic-layered recording surface and a non-recording surface containing a servo tracking pattern, the non-recording surface including at least two layers containing inorganic particles, a first outer layer containing inorganic particles larger in size than inorganic particles contained in a second inner layer, wherein the servo tracking pattern includes depressions extending through the first outer layer to the second inner layer.

2. The magnetic tape of claim 1, wherein the inorganic particles of the first outer layer and the second inner layer are carbon black particles.

3. The magnetic tape of claim 1 wherein the size of the particles in the first outer layer is in the range of 50–80 nm.

4. The magnetic tape of claim 1 wherein the size of the particles in the second inner layer is in the range of 20–35 nm.

5. The magnetic tape of claim 1 wherein the servo tracking pattern includes optical properties different from a non-patterned region of the non-recording surface.

6. The magnetic tape of claim 5 wherein said optical properties comprises an absorbance, reflectance or transmission of light, and the difference between said pattern and the nonpatterned region of the non-recording surface in absorbance, reflectance or transmission of light having a prescribed wavelength used for servo tracking is about 10% or more.

7. The magnetic tape of claim 1 wherein said magnetic tape further comprises a layer of a metal or a metal alloy disposed between said substrate and said second inner layer, and the servo tracking pattern comprising depressions extending into said metal or metal alloy layer.

8. The magnetic tape of claim 7 wherein said servo tracking pattern has a width of from about 0.1 to about 30 $\mu$m and a depth in said metal or metal alloy layer of from about ⅓ of the thickness of said metal or alloy layer up to the entire thickness of said metal or metal alloy layer.

9. A magnetic tape comprising a substrate having disposed on opposite sides thereof a recording surface, and a non-recording surface containing a regular pattern for servo tracking along a longitudinal direction of the tape which pattern has optical properties which differ from a non-patterned region of the non-recording surface, wherein the recording surface comprises a magnetic layer, and the non-recording surface comprises at least two layers containing inorganic particles, an inner layer containing particles sized smaller than particles contained in an outer layer, wherein the pattern includes depressions extending through the outer layer to the inner layer.

10. A magnetic tape comprising a substrate having on one side thereof a recording surface comprising a magnetic layer, and on the other side thereof a backcoat system having disposed along the longitudinal direction of the tape a regular pattern for servo tracking having optical properties different from a non-patterned region, the backcoat system including at least two layers comprising a first outer layer and a second inner layer containing carbon black particles, the first outer layer containing carbon black particles sized larger than carbon black particles contained in the second inner layer, wherein the pattern includes depressions extending through the first outer layer to the second inner layer.

11. A magnetic tape according to claim 10, wherein
the regular pattern comprises a repeating pattern of marks extending along substantially the length of the tape.

12. The magnetic tape according to claim 10, wherein
the regular pattern comprises a repeating pattern of marks extending transversely to an axis substantially perpendicular to the longitudinal edge of the tape.

13. A method of making a recording tape, comprising providing a substrate having disposed on one side thereof a magnetic layer serving as a recording surface and on the other side thereof a backcoating system comprising a first outer layer and a second inner layer, the first outer layer containing particles sized larger than particles contained in the second inner layer, and directing a beam of light at said backcoat layer thereby to form an optically detectable depression in said backcoat layer, the depression extending through the first outer layer to the second inner layer.

14. A method according to claim 13, further comprising forming a plurality of depressions in the first outer layer and the second inner layer.

* * * * *